US012004283B2

(12) United States Patent
Duncan et al.

(10) Patent No.: US 12,004,283 B2
(45) **Date of Patent: *Jun. 4, 2024**

(54) ELECTROMAGNETIC WAVE REDUCING HEATERS AND DEVICES AND SAUNAS

(71) Applicant: Sauna Works Inc. (aka Far Infrared Sauna Technology Co.), Berkeley, CA (US)

(72) Inventors: Raleigh C. Duncan, Berkeley, CA (US); Andrew Kaps, San Francisco, CA (US)

(73) Assignee: SAUNA WORKS INC., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,847

(22) Filed: Mar. 20, 2023

(65) Prior Publication Data

US 2023/0232505 A1 Jul. 20, 2023

Related U.S. Application Data

(63) Continuation of application No. 17/394,315, filed on Aug. 4, 2021, now Pat. No. 11,641,702, which is a (Continued)

(51) Int. Cl.
*H05B 6/10* (2006.01)
*A61H 33/06* (2006.01)

(Continued)

(52) U.S. Cl.
CPC ............ *H05B 6/44* (2013.01); *A61H 33/063* (2013.01); *H01F 27/36* (2013.01); *H05B 3/26* (2013.01);

(Continued)

(58) Field of Classification Search
CPC ... H05B 6/10; H05B 6/44; H05B 3/12; H05B 3/145; H05B 3/16; H05B 3/20;

(Continued)

(56) References Cited

U.S. PATENT DOCUMENTS 2,146,977 A 2/1939 Emil
2,416,977 A 3/1947 Brown et al.

(Continued)

FOREIGN PATENT DOCUMENTS

CN 201639794 U 11/2010
CN 206237620 U 6/2017

(Continued)

OTHER PUBLICATIONS

U.S. Appl. No. 17/101,909, USPTO e-Office Action: NOA—Notice Of Allowance And Fees Due (Ptol-85), dated Aug. 2, 2023, 7 pages.

(Continued)

*Primary Examiner* — Hung D Nguyen
(74) *Attorney, Agent, or Firm* — Kwan & Olynick LLP

(57) ABSTRACT

Systems may include a heater including a plurality of heating elements that may include a first heating element configured to generate heat based on a first current, and a second heating element configured to generate heat based on a second current. Systems may further include an electromagnetic (EM) radiation reducing device configured to cancel electromagnetic emissions from the heater. The EM radiation reducing device may include a first EM radiation reduction element positioned adjacent to a first side of the heater, and a second EM radiation reduction element positioned adjacent to a second side of the heater, where the first and second EM radiation reduction elements have geometries configured based, at least in part, on the heater.

20 Claims, 11 Drawing Sheets

Related U.S. Application Data continuation of application No. 16/206,706, filed on Nov. 30, 2018, now Pat. No. 11,202,346, which is a continuation-in-part of application No. 15/806,262, filed on Nov. 7, 2017, now Pat. No. 10,869,367, which is a continuation of application No. 13/427, 899, filed on Mar. 23, 2012, now Pat. No. 9,844,100.

(60) Provisional application No. 62/593,183, filed on Nov. 30, 2017, provisional application No. 61/467,884, filed on Mar. 25, 2011.

(51) Int. Cl.
*H01F 27/36* (2006.01)
*H05B 3/26* (2006.01)
*H05B 6/44* (2006.01)

(52) U.S. Cl.
CPC ......... *H05B 6/10* (2013.01); *A61H 2033/061* (2013.01); *A61H 2201/0221* (2013.01); *H05B 2203/011* (2013.01); *H05B 2203/013* (2013.01); *H05B 2203/014* (2013.01)

(58) Field of Classification Search
CPC .......... H05B 3/26; H05B 3/342; H05B 3/565; H05B 2203/011; H05B 2203/013; H05B 2203/014; H05B 2203/017; H05B 2203/032; A61H 33/063; A61H 2033/061; A61H 2201/0221; H01F 27/36
USPC .... 219/212, 213, 466.1, 505, 528, 529, 545, 219/548, 549, 553, 554, 600
See application file for complete search history.

(56) References Cited

U.S. PATENT DOCUMENTS

| | | | | |
|---|---|---|---|---|
| 5,023,433 | A | 6/1991 | Gordon | |
| 5,296,686 | A | 3/1994 | Ullrich et al. | |
| 5,761,377 | A | 6/1998 | Wolfe et al. | |
| 5,796,076 | A | 8/1998 | Azuma | |
| 5,889,923 | A | 3/1999 | Lee et al. | |
| 6,300,597 | B1 | 10/2001 | Lee | |
| 7,120,353 | B2 | 10/2006 | Schaeffer et al. | |
| 7,538,279 | B2 | 5/2009 | Lee | |
| 8,692,168 | B2 | 4/2014 | Benda et al. | |
| 9,393,176 | B2 * | 7/2016 | Benda | H05B 3/26 |
| 9,844,100 | B2 | 12/2017 | Duncan et al. | |
| 10,869,367 | B2 | 12/2020 | Duncan et al. | |
| 11,202,346 | B2 | 12/2021 | Duncan et al. | |
| 11,471,376 | B2 | 10/2022 | Duncan | |
| 11,792,896 | B2 | 10/2023 | Duncan et al. | |
| 2003/0031471 | A1 | 2/2003 | Schneider et al. | |
| 2003/0156831 | A1 | 8/2003 | Schaeffer et al. | |
| 2006/0180336 | A1 | 8/2006 | King et al. | |
| 2006/0289463 | A1 | 12/2006 | Kil | |
| 2007/0110413 | A1 | 5/2007 | Konishi | |
| 2008/0143249 | A1 | 6/2008 | Lee et al. | |
| 2008/0292293 | A1 | 11/2008 | Song | |
| 2009/0279879 | A1 | 11/2009 | Zenteno et al. | |
| 2010/0072892 | A1 | 3/2010 | Watanabe et al. | |
| 2012/0241440 | A1 | 9/2012 | Duncan et al. | |
| 2013/0187066 | A1 | 7/2013 | Heller et al. | |
| 2013/0319998 | A1 * | 12/2013 | Benda | F24D 13/02 219/553 |
| 2014/0374403 | A1 | 12/2014 | Smith | |
| 2018/0063898 | A1 | 3/2018 | Duncan et al. | |
| 2019/0110339 | A1 | 4/2019 | Duncan et al. | |
| 2020/0100984 | A1 | 4/2020 | Duncan | |
| 2021/0076461 | A1 | 3/2021 | Duncan et al. | |
| 2021/0368590 | A1 | 11/2021 | Duncan et al. | |
| 2023/0413396 | A1 | 12/2023 | Duncan et al. | |

FOREIGN PATENT DOCUMENTS

| | | | |
|---|---|---|---|
| JP | S588673 | A | 1/1983 |
| JP | H07312277 | A | 11/1995 |
| JP | H10261542 | A | 9/1998 |
| WO | 2020113134 | A1 | 6/2020 |

OTHER PUBLICATIONS

U.S. Appl. No. 17/931,889, USPTO e-Office Action: CTFR—Final Rejection, dated Aug. 11, 2023, 8 pages.
"Advisory Action", Advisory Action U.S. Appl. No. 13/427,899, dated Sep. 27, 2016, 3 pages.
"Final Office Action", Final Office Action, U.S. Appl. No. 13/427,899, dated Aug. 24, 2015, 6 pages.
"Int'l Application Serial No. PCT/US17/45171, Int'l Search Report and Written Opinion dated Oct. 12, 2017", 7 pages.
"Non-Final Office Action", Non-Final Office Action, U.S. Appl. No. 13/427,899, dated Feb. 12, 2015, 5 pages.
"U.S. Appl. No. 13/427,899, Advisory Action dated Jun. 8, 2017", 3 pages.
"U.S. Appl. No. 13/427,899, Final Office Action dated Mar. 31, 2017", 8 pages.
"U.S. Appl. No. 13/427,899, Notice of Allowance dated Aug. 8, 2017", 5 pgs.
Advisory Action Advisory Action U.S. Appl. No. 13/427,899, dated Sep. 27, 2016, 3 pgs.
Advisory Action U.S. Appl. No. 13/427,899, dated Sep. 27, 2016, 3 pgs.
U.S. Appl. No. 15/806,262, Final Rejection, dated Mar. 2, 2020, 7 pgs.
U.S. Appl. No. 15/806,262, Notice Of Allowance And Fees Due (Ptol-85), dated Aug. 13, 2020, 7 pgs.
U.S. Appl. No. 16/206,706, Non-Final Rejection, dated Nov. 20, 2020, 11 pgs.
U.S. Appl. No. 17/101,909, USPTO e-Office Action: CTFR—Final Rejection, dated May 19, 2023, 9 pages.
U.S. Appl. No. 17/101,909, USPTO e-Office Action: CTNF—Non-Final Rejection, dated Dec. 14, 2022, 11 pages.
U.S. Appl. No. 17/394,315, USPTO e-Office Action: NOA—Notice of Allowance, dated Feb. 14, 2023, 17 pages.
U.S. Appl. No. 17/931,889, USPTO e-Office Action: CTNF—Non-Final Rejection, dated Apr. 17, 2023, 6 pages.
U.S. Appl. No. 13/427,899, Advisory Action dated Jun. 8, 2017, 3 pgs.
U.S. Appl. No. 13/427,899, Final Office Action dated Mar. 31, 2017, 8 pgs.
U.S. Appl. No. 15/226,756, Final Office Action dated Mar. 18, 2019, 16 pgs.
U.S. Appl. No. 15/226,756, Non Final Office Action dated Jul. 6, 2018, 14 pgs.
U.S. Appl. No. 15/806,262, Final Office Action dated Jan. 17, 2019, 9 pgs.
U.S. Appl. No. 15/806,262, Non Final Office Action dated Jun. 20, 2018, 6 pgs.
U.S. Appl. No. 15/806,262, Non Final Office Action dated Jul. 15, 2019, 6 pgs.
U.S. Appl. No. 16/206,706, Notice of Allowance dated Aug. 13, 2021, 8 pgs.
U.S. Appl. No. 16/693,109, Final Office Action dated Feb. 10/228 pgs.
U.S. Appl. No. 16/693,109, Non-Final Office Action dated Jun. 11, 2021, 8 pgs.
U.S. Appl. No. 16/693,109, Notice of Allowance dated Jun. 24, 2022, 8 pgs.
U.S. Appl. No. 16/206,706, Notice of Allowance dated May 4, 2021, 8 pgs.
Final Office Action, U.S. Appl. No. 13/427,899, dated Aug. 24, 2015, 7 pgs.
International Application Serial No. PCT/US19/63797, Preliminary Report on Patentability dated Jun. 10, 2021, 6 pgs.

(56) References Cited

OTHER PUBLICATIONS

International Application Serial No. PCT/US19/63797, Search Report and Written Opinion dated Feb. 25—208 pgs.
Int'l Application Serial No. PCT/US17/45171, Int'l Search Report and Written Opinion dated Oct. 12, 2017, 7 pgs.
Non-Final Office Action, Non-Final Office Action, U.S. Appl. No. 13/427,899, dated Feb. 12, 2015, 5 pgs.
Non-Final Office Action, U.S. Appl. No. 13/427,899, dated Feb. 12, 2015, 5 pgs.
Translation of CN201639794U, Novel low-electromagnetic radiation planar heating body, Nov. 17, 2010, by Pro Quest. (Year: 2010).
Translation of JP 1 0-261542A, Capacitor and Its manufacture, Sep. 29, 1998, by ProQuest. (Year: 1998).
U.S. Appl. No. 15/806,262, Final Office Action dated Jan. 17, 2019, 16 pages.
U.S. Appl. No. 15/806,262, Non-Final Office Action dated Jun. 20, 2018, 9 pages.
U.S. Appl. No. 17/931,889, USPTO e-Office Action: NOA—Notice Of Allowance And Fees Due (Ptol-85), dated Oct. 20, 2023, 7 pages.

* cited by examiner

ELECTROMAGNETIC WAVE REDUCING HEATERS AND DEVICES AND SAUNAS

CROSS-REFERENCE TO RELATED APPLICATIONS

The present application is a continuation of U.S. patent application Ser. No. 17/394,315, filed Aug. 4, 2021, which is a continuation of U.S. patent application Ser. No. 16/206,706, filed Nov. 30, 2018, now U.S. Pat. No. 11,202,346 issued on Dec. 14, 2021, which claims the benefit of U.S. provisional patent application No. 62/593,183, filed Nov. 30, 2017, and is a continuation-in-part of U.S. patent application Ser. No. 15/806,262, filed Nov. 7, 2017, now U.S. Pat. No. 10,869,367 issued on Dec. 15, 2020, which is a continuation of U.S. patent application Ser. No. 13/427,899, filed Mar. 23, 2012, now U.S. Pat. No. 9,844,100 issued on Dec. 12, 2017, which claims the benefit of U.S. provisional patent application No. 61/467,884, filed Mar. 25, 2011, all of which are incorporated herein by reference in their entirety.

TECHNICAL FIELD

The present application relates to heating elements, specifically to a planar electric heating element that has low electromagnetic wave emissions.

DESCRIPTION OF RELATED ART

Electric heating utilizes either linear heating elements made out of nickel and heating wires, or planar heating elements made of spread carbon microfiber or carbon micro powder. Electric heating makes it easy to control its temperature, does not pollute the air, and is sanitary and noiseless. Because it is quick to heat up and because it emits infrared rays, electric heating is very useful in many applications, such as residential buildings (apartment complexes, homes, and retirement communities), commercial buildings, industrial buildings (work yards, warehouses, and outdoor covered structures), and agricultural buildings.

However, even though electric heating elements have many merits, many people are reluctant to use them because of the negative effects of the electromagnetic waves they emit. Electromagnetic waves are generated wherever electricity flows. There has been a suggestion that electromagnetic waves induce anxiety in humans and are harmful to general health. Since heating elements are typically used at close range, electromagnetic emissions are a serious concern.

SUMMARY

Embodiments disclosed herein reduce electromagnetic wave emissions from a heater by using pairs of heaters, each powered by alternating current in opposite phases. The two heaters are located very close to each other so that the electromagnetic waves coming from one heater are canceled out by the electromagnetic waves coming from the other. The heating efficiency, however, is preserved. While various embodiments disclosed herein use planar heating elements, other embodiments may use other heater types, as long as those heater types can be paired in such a way as to cancel out each other's electromagnetic emissions.

In various embodiments, a heating element comprises two planar conductive elements, each one connected to electrodes at both poles; a layer of insulation between the two planar conductive elements; an insulation layer on the outside of each planar conductive element; and a means to cancel the electromagnetic fields generated around the planar conductive elements by connecting them to alternating current sources that are opposite in phase with respect to each other. This method of connection reduces the electromagnetic waves generated over the entire surface of the planar heating element, especially over the electrodes where the electromagnetic emissions are the strongest.

Also disclosed herein are various systems and devices for electromagnetic (EM) radiation reduction that may be implemented with various heaters and heating elements. Systems may include a heater including a plurality of heating elements that may include a first heating element configured to generate heat based on a first current, and a second heating element configured to generate heat based on a second current. Systems may further include an EM radiation reducing device configured to cancel electromagnetic emissions from the heater. The EM radiation reducing device may include a first EM radiation reduction element positioned adjacent to a first side of the heater, and a second EM radiation reduction element positioned adjacent to a second side of the heater, where the first and second EM radiation reduction elements have geometries configured based, at least in part, on the heater.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Reference will now be made in detail to some specific examples including the best modes contemplated by the inventors. Examples of these specific embodiments are illustrated in the accompanying drawings. While various embodiments are disclosed herein, it will be understood that they are not intended to limit the invention to the described embodiments. On the contrary, they are intended to cover alternatives, modifications, and equivalents as may be included within the spirit and scope of the invention as defined by the appended claims.

For example, the techniques of the present invention will be described in the context of saunas, and heating elements associated with such saunas. However, it should be noted that the techniques of the present invention apply to a wide variety of different environments and enclosures. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a heater in a variety of contexts. However, it will be appreciated that a system can use multiple heaters while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. Consequently, a connection does not necessarily mean a direct, unimpeded connection unless otherwise noted.

Figure 1:
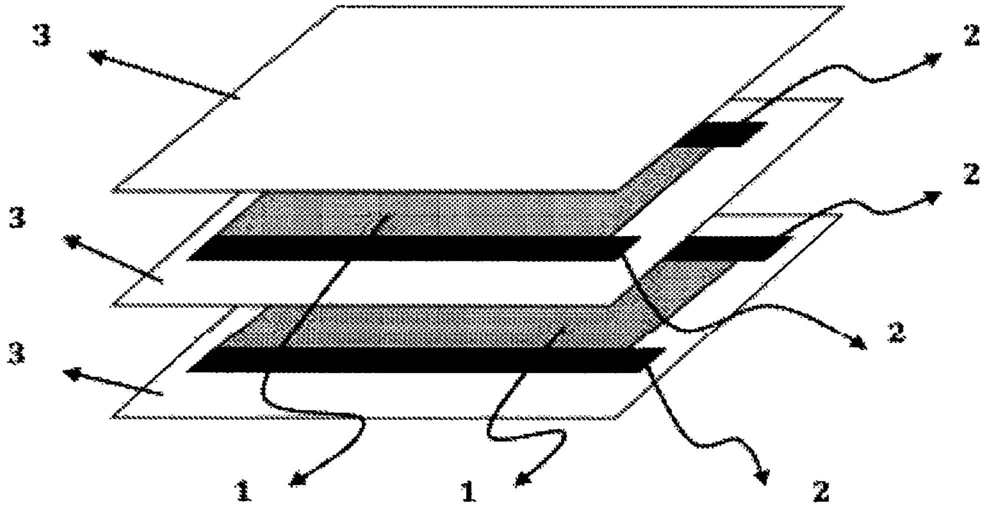
FIG. 1 shows an example of a heater that includes heating elements, configured in accordance with some embodiments.

FIG. 1 shows an example of a heater that includes heating elements, configured in accordance with some embodiments. Accordingly, a heater may include various planar conductive elements, such as planar conductive elements 1 that are connected to electrodes 2. The planar conductive elements can be made of metal, of carbon powder or carbon fibers mixed in a binder and printed, coated, or impregnated on plastic film, fabric, or paper, of carbon fibers mixed in a paper form or carbon felt, or of etched metal foil. The electrodes can be made of either rolled or electrolyzed metal foil. Rolled metal foil is more commonly used thanks to its higher yield strength; a thickness of the metal foil is about 20-60 microns. An insulation layer 3 is placed between the planar conductive elements and on the outside of each planar conductive element. For low-temperature planar heating elements of less than 80 □C, polyester or heat-resistant plastic film or sheet is preferable, while for high-temperature planar heating elements of greater than 80 degrees C., high heat resistant hardening resin such as hardening epoxy resin is preferable. The thickness of the insulation layer is preferably 100-200 microns in terms of its insulation characteristics, though it can be greater than 200 microns where excellent insulation characteristics are required. When external wire is connected to copper foil, soldering or wire-connecting terminals are used; the connection must be securely fastened to sustain substantial external force and properly insulated.

Figure 2:
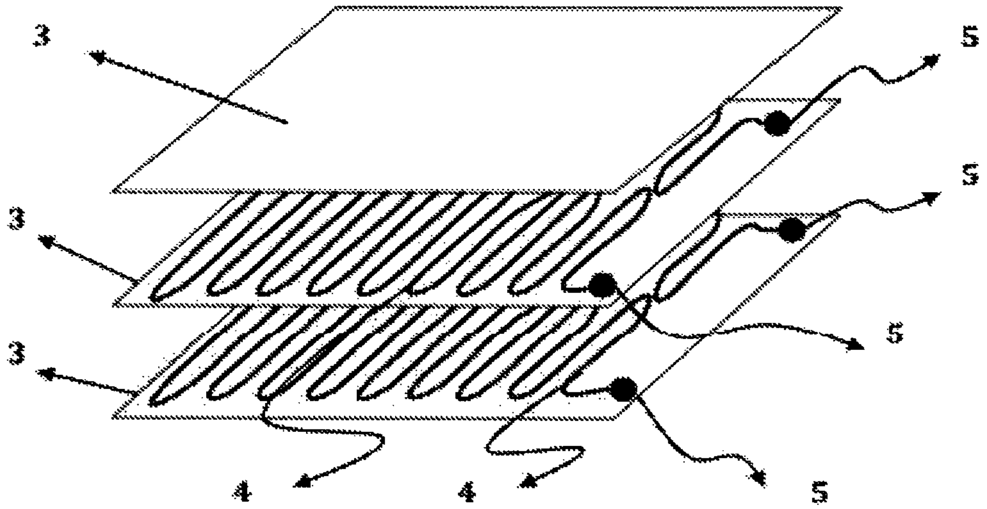
FIG. 2 shows another example of a heater, configured in accordance with some embodiments.

FIG. 2 shows an alternate embodiment of a heater, where the planar heating element 4 is made of metal and comprises a wire disposed in a planar fashion over the surface of the insulation 3. The planar heating element 4 is then connected to electrodes 5.

Figure 3:
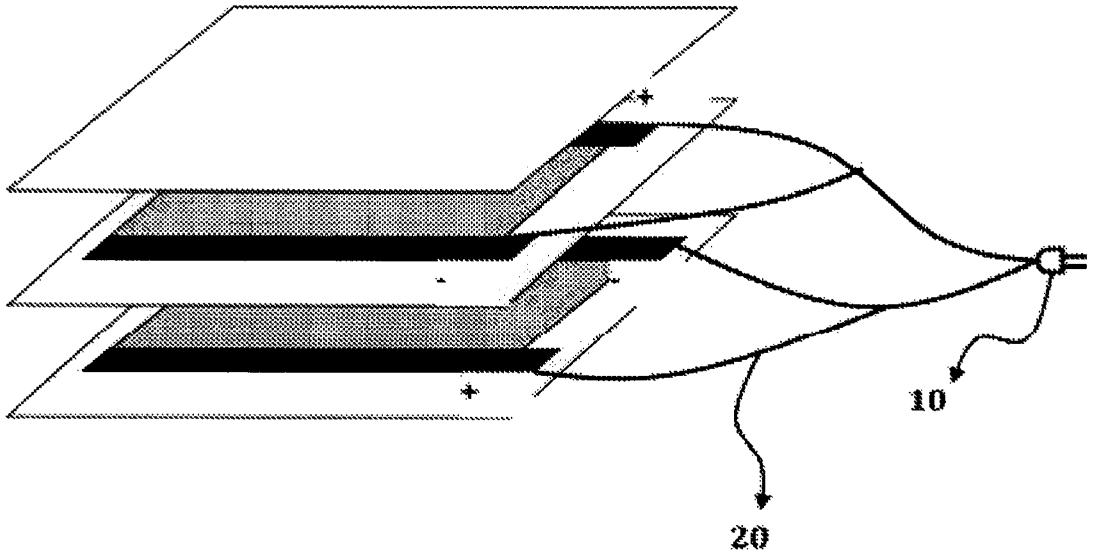
FIG. 3 shows an additional example of a heater, configured in accordance with some embodiments.
Figure 4:
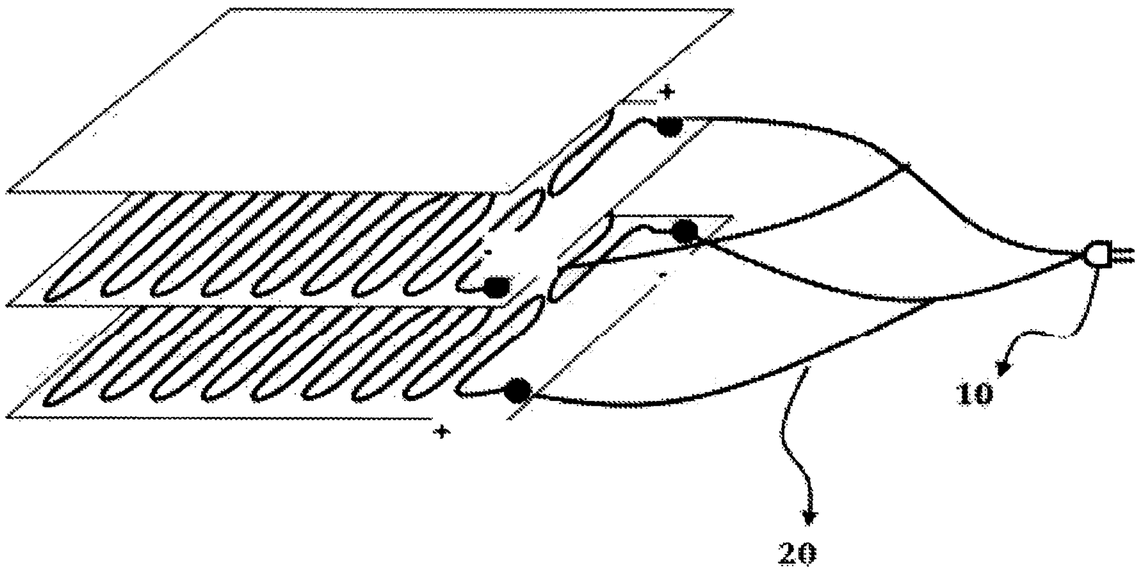
FIG. 4 shows a further example of a heater, configured in accordance with some embodiments.

FIGS. 3 and 4 show the electrical design of heaters, configured in accordance with some embodiments. Electrical signal 10 is opposite in phase from electrical signal 20. As a result, the electromagnetic waves that are generated by one planar conductive element are canceled out by the electromagnetic waves generated by the other planar conductive element.

Figure 5:
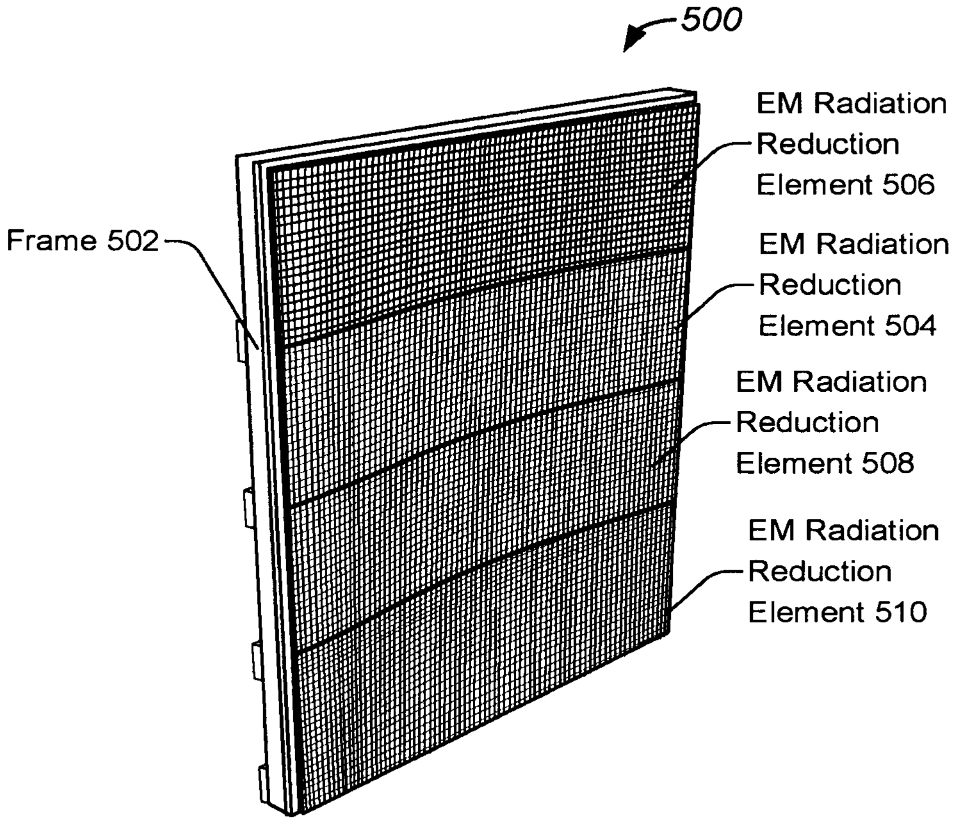
FIG. 5 shows an embodiment of an electromagnetic radiation reducing device, configured in accordance with some embodiments.

FIG. 5 shows an embodiment of an electromagnetic radiation reducing device. As will be discussed in greater detail below, such devices may be configured to remove and/or reduce extremely low frequency (ELF) electromagnetic (EM) radiation that may be emitted from one or more components of a sauna, or one or more components outside of a sauna. In various embodiments, such ELF radiation may be EM radiation in the range of about 3 to 30 Hz.

In various embodiments, such devices may be configured to mitigate and/or abate low frequency components of electrical fields that may be generated by heaters. As discussed herein and below heaters may include multiple heating elements which may be planar heating elements. Accordingly, the heaters described below may be implemented in accordance with any of the embodiments described above with reference to FIGS. 1-4. As discussed above, such ELF radiation may cause undesired effects or experiences in a user of a sauna that includes heaters as discussed above. Accordingly, various EM radiation reducing devices may be implemented to reduce such electrical emissions received at the user, and mitigate such undesired effects.

As will be discussed in greater detail below, particular configurations and geometries may be used to implement such EM radiation reducing devices. Such geometries may increase the efficiency and efficacy of the reduction of EM radiation. For example, the use of an elliptical or spherical geometry may be more effective based because it has a greater capacity to collect charge because of its' larger surface area as compared to a planar mesh, and it pulls electrical charge off from both sides thus reducing the amount of charge that any one side has to collect. Accordingly, such implementations of EM radiation reducing devices provide increases in the efficiency of the removal of unwanted EM radiation.

In various embodiments, EM radiation reducing devices are conductive devices made of a conductive material, such as a metal mesh. In some embodiments, the material may be a mesh cloth treated with a conductive material, such as being printed with an electrically conductive material such as carbon ink. The EM radiation devices may be configured to be made of a material having a conductivity and density determined based on a configuration of a heater implemented in conjunction with the EM radiation devices. For example, the composition of a material of the EM radiation device, which may be metal, as well as one or more other features, such as a density of mesh or grating, may be determined based on characteristics of the heaters, such as a number of heaters, as well as operational parameters, such as frequency and amplitude, of the heaters.

As shown in FIG. 5, an EM radiation reducing device, such as EM radiation reducing device 500, may include a housing or frame, such as frame 502, that may be implemented with one or more EM radiation reduction elements, such as EM radiation reduction element 504. In various embodiments, such EM radiation reduction elements may be made of a conductive material, such as a conductive mesh. Furthermore, EM radiation reduction element 504 may have a particular geometry configured based on one or more characteristics or features of heating devices, also referred to herein as heaters, such as the heaters discussed above with reference to FIGS. 1-4.

In various embodiments, parameters and a geometry of EM radiation reduction element 504 may also be configured based on a shape or geometry of the housing or frame 502, which may be a frame made of any suitable material such as wood or polymer, and attachment points between EM radiation reduction element 504, which may be a mesh, and frame 502. Accordingly, EM radiation reduction element 504 may have a curved and elliptical shape configured based on characteristics of a heater, and may have a footprint or peripheral shape configured based on characteristics of frame 502, and attachment points of frame 502.

As shown in FIG. 5, EM radiation reducing device 500 may include multiple EM radiation reduction elements, such as EM radiation reduction element 504, EM radiation reduction element 506, EM radiation reduction element 508, and EM radiation reduction element 510. In various embodiments, each of the EM radiation reduction elements may correspond to, and face a heater. Accordingly, each of the EM radiation reduction devices may have a corresponding heater for which it reduces ELF EM radiation. In some embodiments, the EM radiation reduction elements may collectively reduce ELF EM radiation for a single heater. Accordingly, frame 502 may be configured to partially encapsulate a heater, and EM radiation reduction elements 504, 506, 508, and 510 may be configured to collectively mitigate ELF EM radiation of the heater.

In this way, particular portions of EM radiation reduction elements may be configured and contoured based on different portions of a housing to implement EM radiation reduction that is configured for a plurality of heaters, or for specific portions of a single heater, and the configuration of the EM radiation reducing devices may be implemented in a modular fashion that utilizes multiple EM radiation reduction elements on a single housing or frame. Moreover, as will be discussed in greater detail below, EM radiation reduction elements may have a curved geometry that is configured to encapsulate one or more heaters, and such EM radiation reduction elements may be implemented on various sides or relative to several orientations of heaters. For example, a first EM radiation reduction element may be implemented facing a top surface of a heater, and a second EM radiation reduction element may be implemented facing a bottom surface of a heater. In this example, the first and second EM radiation reduction elements may encapsulate the heater and have an elliptical geometry.

In various embodiments, EM radiation reduction elements 504, 506, 508, and 510, as well as heaters, may be removably coupled with frame 502. Accordingly, different configurations of heaters and EM radiation reduction elements may be implemented on a single frame by changing positions heaters and EM radiation reduction elements along frame 502. In this way, the position of such heaters and EM radiation reduction elements may be configured for a particular user to target specific portions of a user, such as a knee or shoulder. While FIG. 5 illustrates some examples of such EM radiation reducing devices, such examples are not intended to be limiting, and various other configurations are possible as well.

Figure 6:
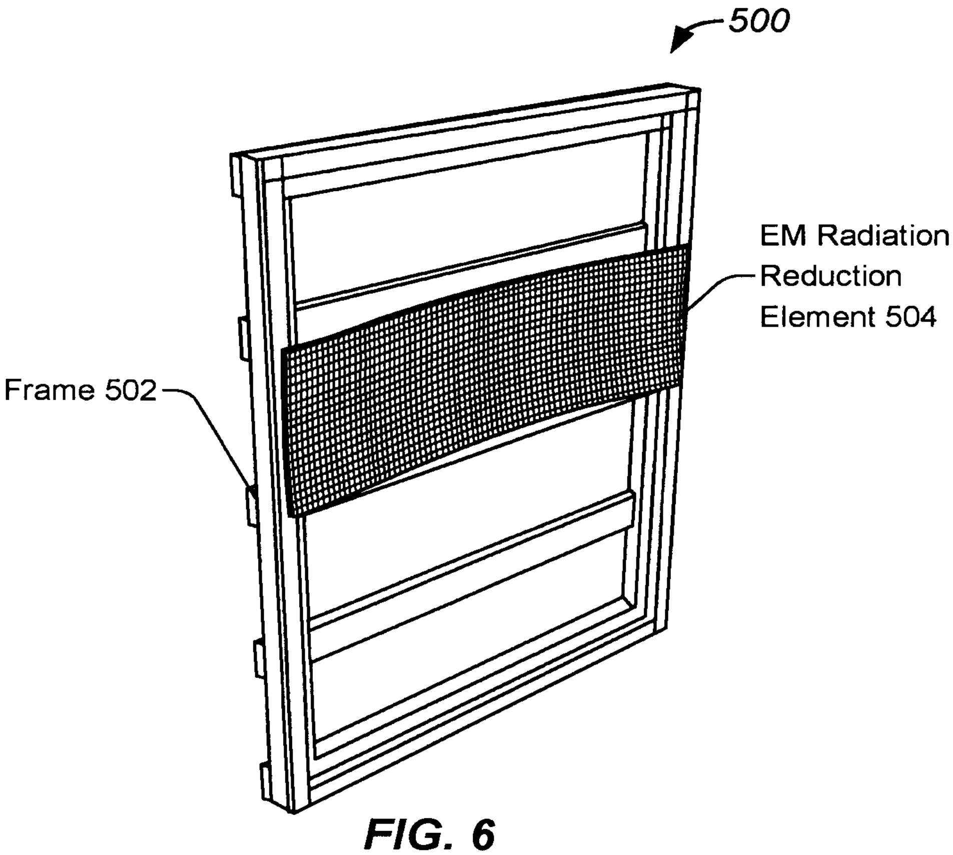
FIG. 6 shows another embodiment of an electromagnetic radiation reducing device, configured in accordance with some embodiments.

FIG. 6 shows another embodiment of an electromagnetic radiation reducing device. As discussed above, an EM radiation reducing device, such as EM radiation reducing device 500, may include frame 502 and one or more EM radiation reduction element, such as EM radiation reduction element 504. FIG. 6 illustrates how such EM radiation reduction elements may be implemented in a modular fashion such that one of multiple heaters may be shielded if multiple heaters are covered by frame 502. In various embodiments, where frame 502 covers a single heater, EM radiation reduction element 504 may be positioned and configured to shield a specific portion of the heater, while other portions are left open.

Figure 7:
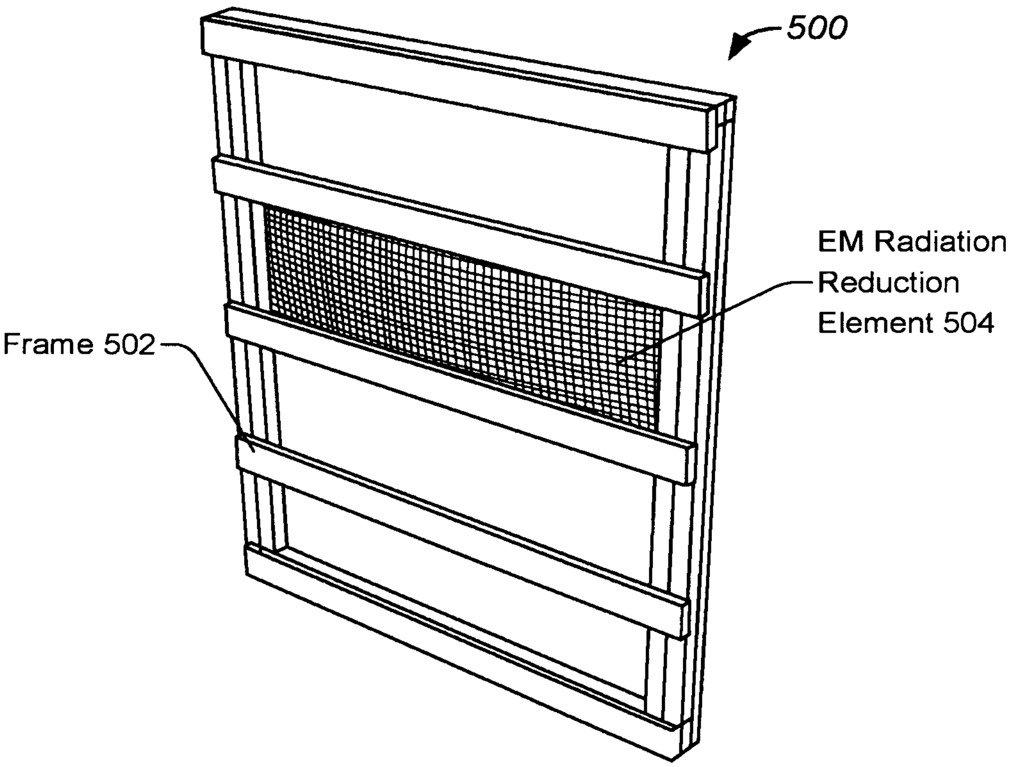
FIG. 7 shows yet another embodiment of an electromagnetic radiation reducing device, configured in accordance with some embodiments.

FIG. 7 shows yet another embodiment of an electromagnetic radiation reducing device. Accordingly, FIG. 7 provides another view of the modular implementation described above with reference to FIG. 6 and EM radiation reducing device 500, frame 502, and EM radiation reduction element 504.

Figure 8:
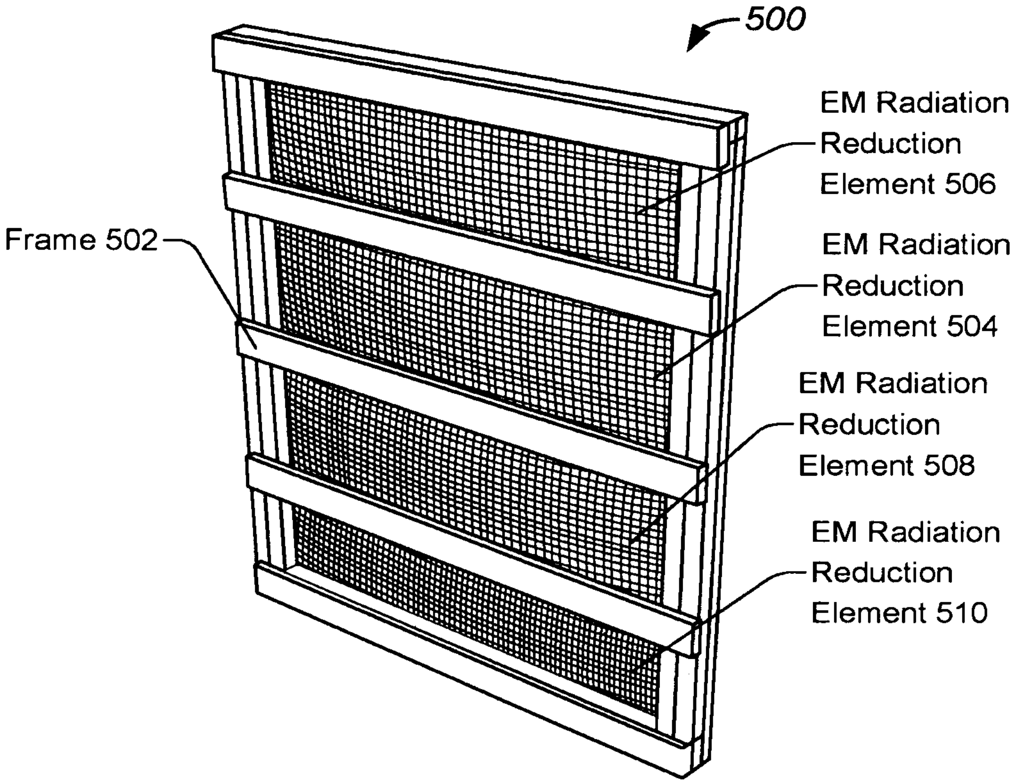
FIG. 8 shows an additional embodiment of an electromagnetic radiation reducing device, configured in accordance with some embodiments.

FIG. 8 shows an additional embodiment of an electromagnetic radiation reducing device. Accordingly, FIG. 8 provides another view of the implementation described above with reference to FIG. 5 and EM radiation reducing device 500, frame 502, EM radiation reduction element 504, EM radiation reduction element 506, EM radiation reduction element 508, EM radiation reduction element 510.

Figure 9:
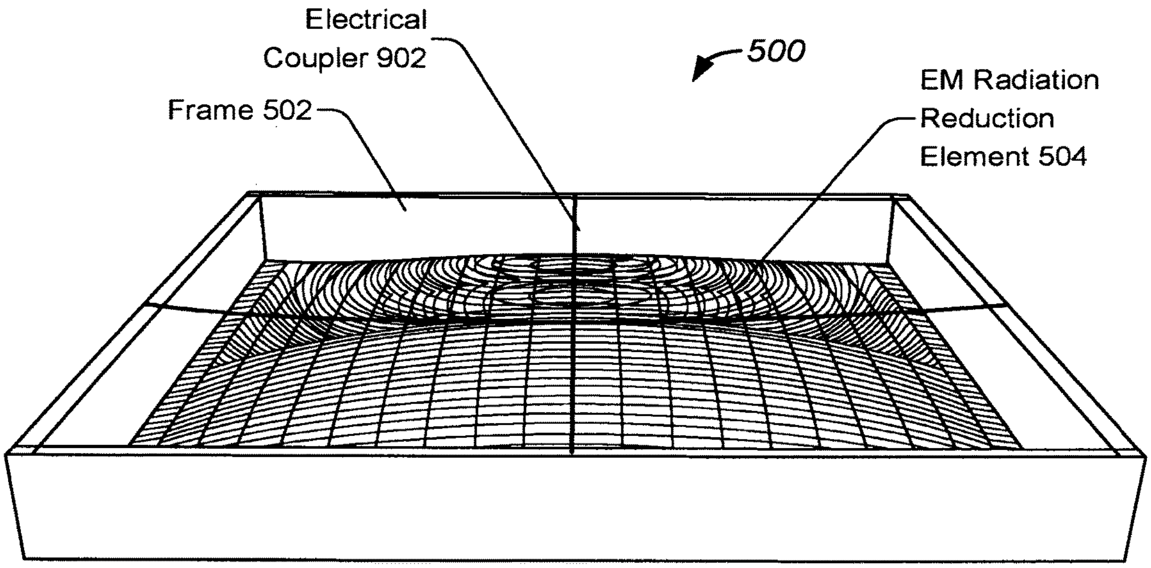
FIG. 9 shows another embodiment of an electromagnetic radiation reducing device, configured in accordance with some embodiments.

FIG. 9 shows another embodiment of an electromagnetic radiation reducing device. As discussed above, EM radiation reducing device 500 may be configured to have a frame as well as one or more EM radiation reduction elements. As shown in FIG. 9, a frame, such as frame 502, may be coupled to particular EM radiation reduction element, such as EM radiation reduction element 504, and may provide structural support for EM radiation reduction element 504. In the example shown in FIG. 9, a peripheral edge of EM radiation reduction element 504 is coupled to frame 502, and such coupling may be implemented via a chemical or adhesive bond, or a mechanical coupling, such as the use fasteners such as nails, staples, or ties. In some embodiments, such coupling may be sealed with metallic tape.

As shown in FIG. 9, EM radiation reduction element 504 has a curved elliptical geometry that is configured to accommodate and, at least in part, encapsulate a heater. Accordingly, as will be discussed in greater detail below, a side of the heater may be surrounded by EM radiation reduction element 504, and the geometry of the curvature of EM radiation reduction element 504 may be configured based on one or more performance characteristics and one or more geometrical features of the heater. For example, a curvature of an EM radiation reduction element may be configured to increase a surface area of EM radiation reduction element that is exposed to the EM field of its associated heating elements.

In one example, if the heating elements are planar heaters, EM radiation reduction elements may have a curvature that is elliptical when viewed at a cross-section. As shown in FIG. 9, and also further illustrated in FIG. 11 as well as various other figures, EM radiation reduction elements may have an elliptical or spherical curvature at a center of the EM radiation reduction element, and such curvature may flatten out towards the edges of the EM radiation reduction elements to facilitate coupling with frames. In this way, the curve of the EM radiation reduction element may be tapered to provide increased ELF EM radiation reduction as well as ease of coupling with frames and installation within a sauna. It will be appreciated that while various embodiments describe elliptical or spherical curvatures, any suitable shape or geometry may be implemented. Accordingly, an EM field or distribution of EM field lines may be determined for heating elements during a design stage, and a contour or shape of a corresponding EM radiation reduction element may be configured to increase a surface area of the EM radiation reduction element that is exposed to the EM field.

In various embodiments, EM radiation reducing device 500 may also include electrical coupler 902 which is configured to provide electrical coupling between EM radiation reduction element 504 and another system component. For example, electrical coupler 902 may be configured to be coupled to an electrical ground, and may provide a discharge path for EM radiation reduction element 504. In this way, the EM radiation reducing devices are coupled to a circuit ground via one or more electrical couplers. In one example, the electrical couplers are ground wires such that EM radiation reduction elements may be coupled to a circuit ground via ground wires. In this way, accumulated charge may be discharged from the EM radiation reduction elements, and may mitigate issues associated with capacitive discharge.

In some embodiments, wires included in electrical coupler 902 may have a crossed arrangement. However, EM radiation reducing devices disclosed herein may be implemented in a variety of ways. For example, EM radiation reducing devices might not include such crossed wires and may utilize coupling of the EM radiation reduction elements to metallized portions of the housing, or one or more ground wires directly coupled to peripheral edges of the EM radiation reduction elements.

Thus, according to various embodiments, portions of the housing may be metallized via utilization of metal components or application of a metallized surface, such as a metallized tape. For example, a surface of a frame, such as frame 502, may be metallized via application of a metallized tape, and such tape may be coupled to a circuit ground. Accordingly, frame 502 may be configured as a circuit ground, and one or more arrangements of ground wires may be implemented with the EM radiation reduction elements. For example, a configuration of electrical coupler 902, such as the crossed-arrangement or a direct coupling, may be used to ground EM radiation reduction element 504, and such configuration maybe determined based on the geometry of the EM radiation reduction element, and/or characteristics of the associated heater, such as a curvature of the heater and corresponding EM radiation reduction element 504 or design constraints of the sauna in which the heaters are implemented.

As will be discussed in greater detail below, housings may be configured to accommodate a heater implemented between two EM radiation reduction elements which have geometries that are configured to accommodate the heater as well as cancel EM radiation emissions from the heater. In some embodiments, to ensure that ELF EM radiation does not “leak” from the housings, additional EM radiation reduction elements may be implemented. In one example, a conductive material is attached to the back of frames on a side of the EM radiation reducing device that is not facing the interior of the chamber of the sauna, but is facing away from the interior. The sides of the conductive material may be coupled to the frame (along all sides or at the four corners), and a middle center may be pre-formed to a curved dome shape or elliptical shape that is configured similar to EM radiation reduction element 504. The conductive material may also be coupled to a circuit ground, thus providing an additional layer of EM radiation reduction for the EM radiation reduction device.

As noted above and discussed in greater detail below, EM radiation reduction element 504 may be implemented in a complimentary manner with another EM radiation reduction element to encapsulate the heater and effectively mitigate EM radiation generated by the heater. Furthermore, in some embodiments, additional EM radiation reduction elements may be implemented along vertical planes around the sides of the housing to seal the heater within the EM radiation reducing device.

Figure 10:
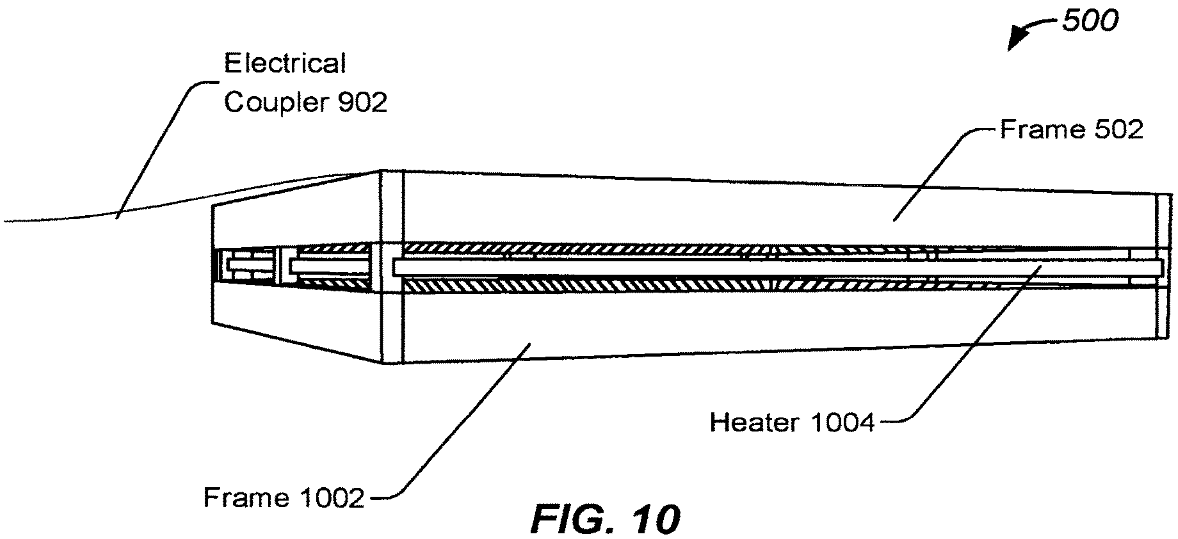
FIG. 10 shows an additional embodiment of an electromagnetic radiation reducing device, configured in accordance with some embodiments.

FIG. 10 shows an additional embodiment of an electromagnetic radiation reducing device. As shown in FIG. 10, EM radiation reducing device 500 may include two frames coupled to each other, such as frame 502 and frame 1002, and each frame may have an EM radiation reduction element as discussed above. FIG. 10 further illustrates heater 1004 encapsulated between the EM radiation reduction elements and electrical coupler 902 is coupled to frame 502 and its corresponding EM radiation reduction element. In various embodiments, frame 502 may be conductively coupled to frame 1002 to provide grounding for frame 1002 and its corresponding EM radiation reduction element thus reducing the number of wires utilized to implement EM radiation reducing device 500.

Figure 11:
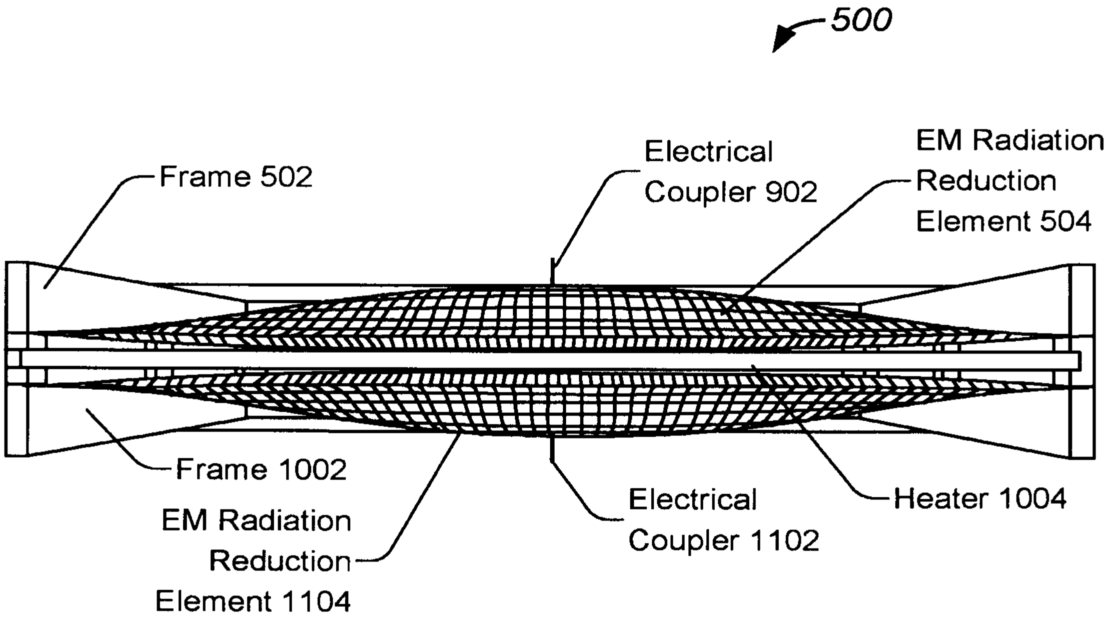
FIG. 11 shows another embodiment of an electromagnetic radiation reducing device, configured in accordance with some embodiments.

FIG. 11 shows another embodiment of an electromagnetic radiation reducing device. FIG. 11 shows a cross-sectional view of EM radiation reducing device 500, as discussed above with reference to FIG. 10, which may include two frames coupled to each other, such as frame 502 and frame 1002, where each frame may have an EM radiation reduction element as discussed above with reference to, for example, EM radiation reduction element 504 and EM radiation reduction element 1104, and heater 1004 is positioned between the EM radiation reduction elements. As shown in FIG. 11, each EM radiation reduction element may have a dedicated discharge path as shown by electrical coupler 902 and electrical coupler 1102.

Figure 12:
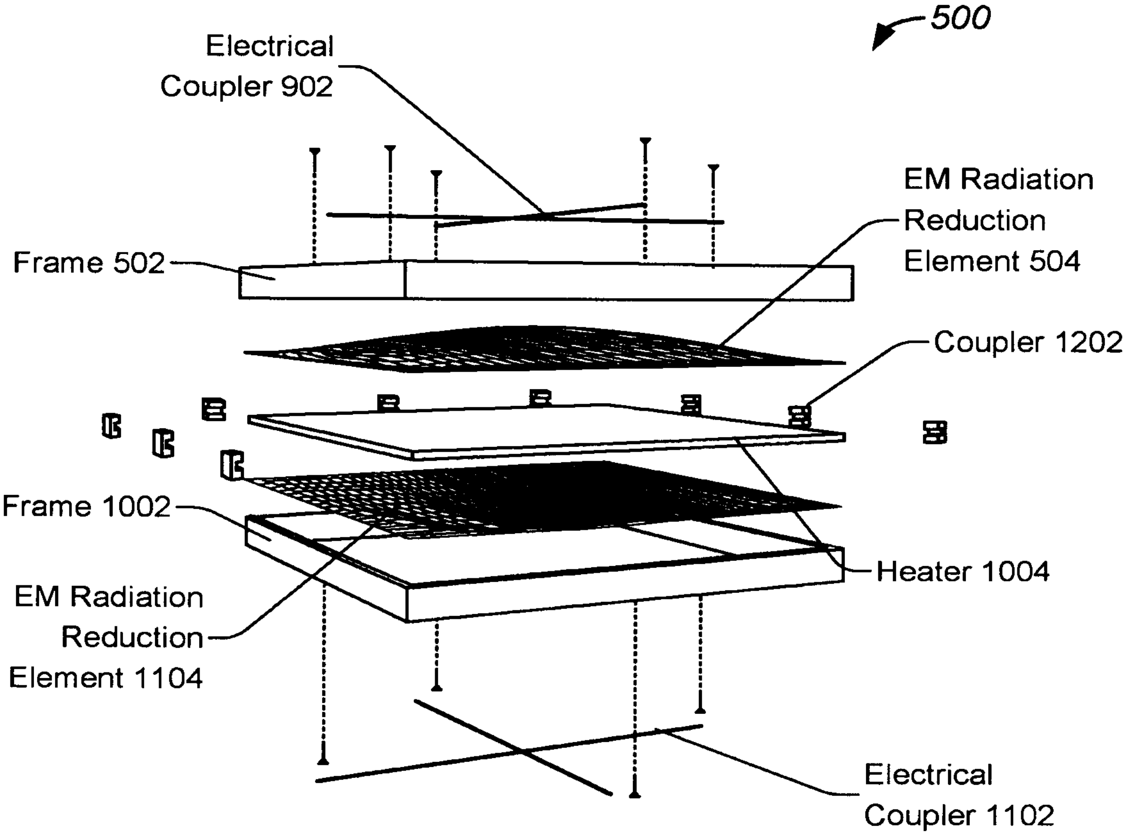
FIG. 12 shows yet another embodiment of an electromagnetic radiation reducing device, configured in accordance with some embodiments.

FIG. 12 shows yet another embodiment of an electromagnetic radiation reducing device. FIG. 12 shows an exploded view of EM radiation reducing device 500, as discussed above with reference to FIG. 10 and FIG. 11, which may include two frames coupled to each other, such as frame 502 and frame 1002, where each frame may have an EM radiation reduction element as discussed above with reference to, for example, EM radiation reduction element 504 and EM radiation reduction element 1104, and heater 1004 is positioned between the EM radiation reduction elements. As shown in FIG. 12, each EM radiation reduction element may have a dedicated discharge path as shown by electrical coupler 902 and electrical coupler 1102. As also shown in FIG. 12, electrical coupler 902 and electrical coupler 1102 may be mechanically coupled to frame 502 and frame 1002 via mechanical fasteners. Furthermore, heater 1004, which as discussed above may be a planar heater, may be mechanically coupled to EM radiation reducing device 500 via several couplers, such as coupler 1202.

In some embodiments, such couplers may be made of an insulative and heat resistant material. For example, such couplers may be made of fiberglass or any suitable material. Moreover, the couplers may also have a groove or indentation configured based on a shape of an edge of heater 1004 thus being configured to grasp heater 1004 and hold heater 1004 in place securely. Furthermore, couplers may be implemented along three sides of EM radiation reducing device 100, and one side may be left open. In this way, heater 1004 may be slide into and out of EM radiation reducing device 500 to provide removable coupling between the two.

Figure 13:
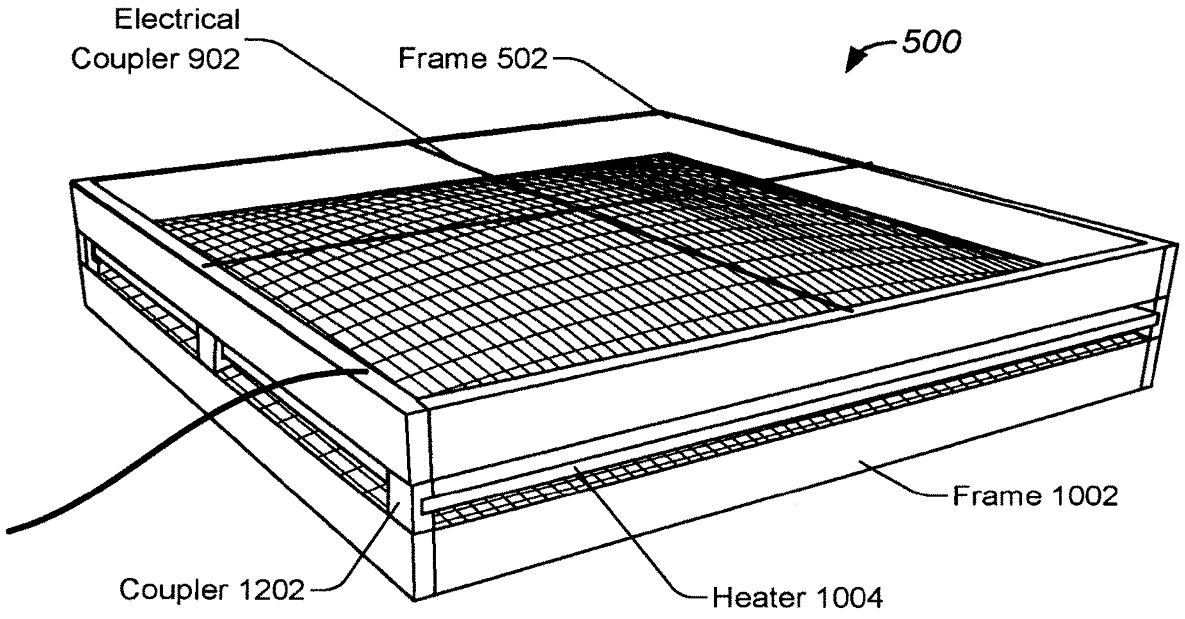
FIG. 13 shows a further embodiment of an electromagnetic radiation reducing device, configured in accordance with some embodiments.

FIG. 13 shows a further embodiment of an electromagnetic radiation reducing device. As discussed above, EM radiation reducing device 500 may include two frames, such as frame 502 and frame 1002, coupled to each other via couplers 1202, where each frame may have an EM radiation reduction element as discussed above, and heater 1004 is positioned between the EM radiation reduction elements. As shown in FIG. 13, a discharge path may be provided by electrical coupler 902. Accordingly, FIG. 13 provides an additional view of EM radiation reducing device 500 having heater 1004 positioned within it, and in a removable manner.

Figure 14:
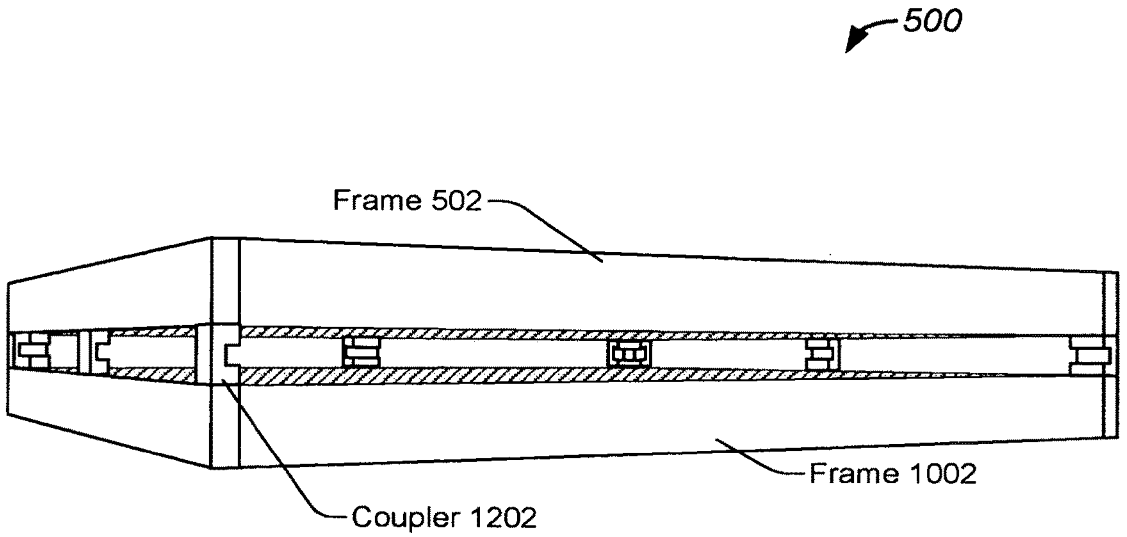
FIG. 14 shows another embodiment of an electromagnetic radiation reducing device, configured in accordance with some embodiments.

FIG. 14 shows another embodiment of an electromagnetic radiation reducing device. As discussed above, EM radiation reducing device 500 may include frames 502 and 1002 coupled to each other with associated EM radiation reduction elements and a discharge path may be provided. FIG. 14 illustrates an example in which heater 1004 has been removed from EM radiation reducing device 100, and EM radiation reducing device 500 is configured to operate as a passive EM radiation reducing device. Accordingly, when configured in this way, EM radiation reducing device 500 may still absorb and discharge ELF EM radiation from other sources, such as other heaters within the sauna, or other ambient sources such as other electrical devices and/or power supplies present within the operational environment of the sauna in which EM radiation reducing device 500 is implemented. It will be appreciated that electrical couplers such as electrical couplers 902 and 1102 may also be included, but have not been shown for clarity purposes.

Accordingly, EM radiation reducing devices as disclosed herein may be implemented within saunas even without heaters installed to provide general protection of a user from exposure to electrical charge generally. For example, the EM radiation reducing devices may be implemented within a sauna as an array of devices that collectively function similar to a Faraday Cage that provide a user within the sauna from protection from ambient electrical charge. In this way, protection of the user may be provided from outside electrical sources even when the heaters are not turned on or present because of the previously described configuration of the EM radiation reducing devices and their grounding arrangement. It will be appreciated that such general protection from ambient electrical charge and fields may also be provided when heaters are installed and operational. In such an example, the EM radiation reducing devices are protecting the user from electrical charge generated by the heaters, as well as ambient electrical charge.

Figure 15:
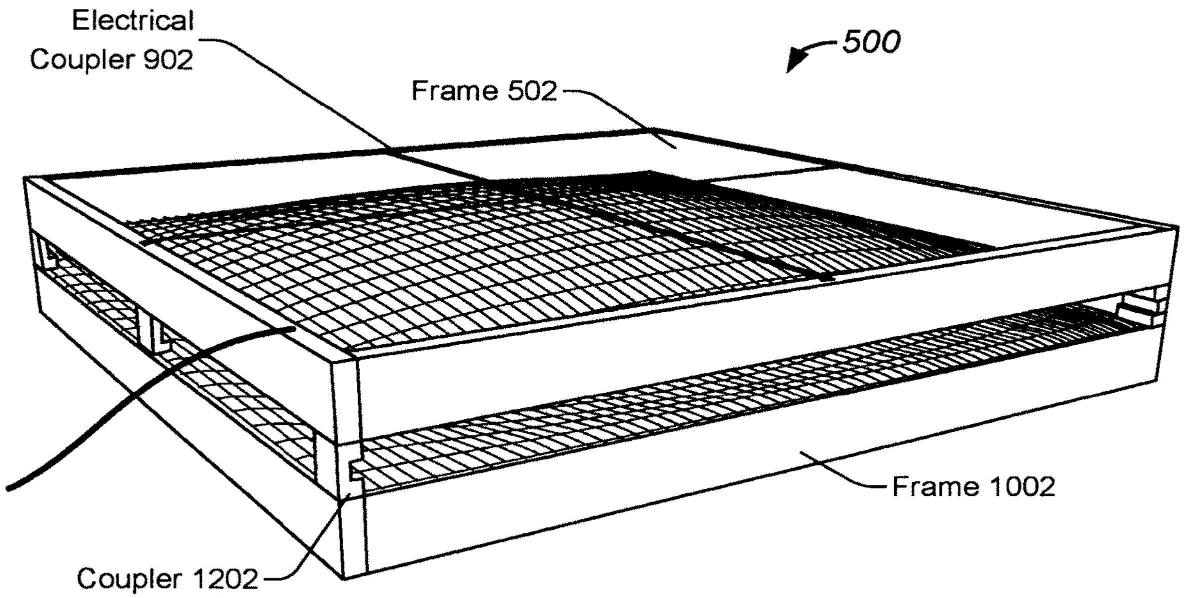
FIG. 15 shows an additional embodiment of an electromagnetic radiation reducing device, configured in accordance with some embodiments.

FIG. 15 shows an additional embodiment of an electromagnetic radiation reducing device. As discussed above, EM radiation reducing device 500 may include frames 502 and 1002 coupled to each other with associated EM radiation reduction elements and a discharge path is provided. FIG. 15 provides an additional view of an example in which heater 1004 has been removed from EM radiation reducing device 100, and EM radiation reducing device 500 is configured to operate as a passive EM radiation reducing device. It will be appreciated that additional embodiments described above may be configured in this way, such as those including two conductive discharge paths. It will also be appreciated that electrical couplers such as electrical couplers 902 and 1102 may be included, but have not been shown for clarity purposes.

While various embodiments have been described with reference to heater 1004 which may be a planar heater, it will be appreciated that any suitable heater may be implemented with the above described embodiments of EM radiation reducing devices such as EM radiation reducing device 100. For example, such heaters may have any suitable geometry and EM radiation reduction elements may be configured in accordance with such geometries. Moreover, such heaters may be any suitable type of heater, such as a carbon heater, metal heater, ceramic heater, or an inductive wire heater.

Figure 16:
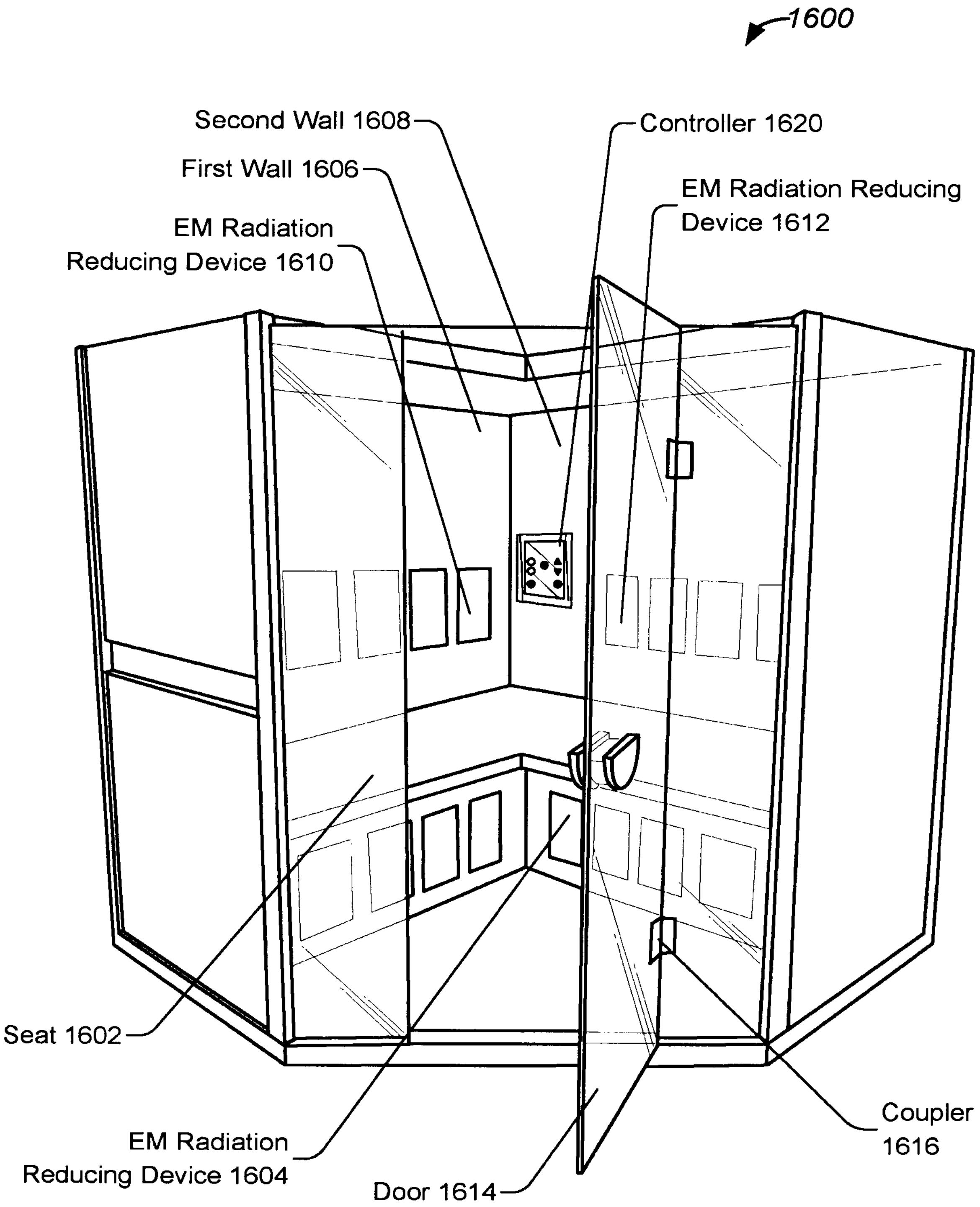
FIG. 16 illustrates an example of a sauna, configured in accordance with some embodiments.

FIG. 16 illustrates an example of a sauna, configured in accordance with some embodiments. As will be discussed in greater detail below, sauna 1600 may be a climate and humidity-controlled enclosure which includes various heaters and heating elements configured to provide heat to one or more users that may be included inside the enclosure of sauna 1600. As will also be discussed in greater detail below, components of sauna 1600 are configured to mitigate and reduce the emission of ELF EM radiation such that ELF EM radiation received by a user of sauna 1600 is reduced. In this way, effects of the ELF EM radiation upon the user are mitigated, thus enabling the efficient and effective utilization of sauna 1600 for various applications, such as therapeutic applications.

As discussed above, sauna 1600 may be an enclosure that is configured to accommodate one or more users in a standing and/or sitting position. Sauna 1600 includes seat 1602, which may be a bench. In various embodiments, seat 1602 includes a plurality of EM radiation reducing devices, such as EM radiation reducing device 1604. In various embodiments, EM radiation reducing device disclosed herein with reference to FIG. 16 may include any and all of the features described above with reference to FIGS. 1-15 and may be implemented with heaters and heating elements as discussed above.

Moreover, walls of sauna 1600, such as first wall 1606 and second wall 1608, may each include pluralities of EM radiation reducing devices as well, such as EM radiation reducing device 1610 and EM radiation reducing device 1612. Accordingly, sauna 1600 may include numerous EM radiation reducing devices which occupy a large amount of the wall space as well as other space of sauna 1600. As noted above, such EM radiation reducing devices may thus be implemented as a large array of EM radiation reducing devices that can be configured actively (with heaters) or passively (with heaters off or removed) to remove and/reduce ambient EM radiation.

In various embodiments, EM radiation reducing device 1604, EM radiation reducing device 1610, and EM radiation reducing device 1612 may all include the same type of heaters and heating elements, or may include different types of heaters and heating elements. For example, the heaters and heating elements may be infrared heating elements configured to emit one or more of near infrared, mid infrared, or far infrared wavelengths. Accordingly, each of the heating elements may be configured to emit a specific infrared wavelength, such as just far infrared wavelengths, or the entire band of near infrared, mid infrared, and far infrared wavelengths. In one specific example, the heating elements may be carbon fiber impregnated heating elements.

Sauna 1600 may also include door 1614 which may be coupled to the rest of the enclosure of sauna 1600 via one or more couplers, such as coupler 1616. In some embodiments, coupler 1616 may be a hinge that is configured to provide free rotation of door 1614. Sauna 1600 may further include controller 1620 which may include one or more processing components which are configured to control the operation of heating elements included in EM radiation reducing device, such as EM radiation reducing device 1604, 1610, and 1612. Accordingly, controller 1620 may include a processor configured to activate and deactivate each of the heaters included in the EM radiation reducing devices in accordance with a predetermined sequence. Controller 1620 may include additional components as well, such as a memory, a display device which may be a touchscreen, and one or more buttons. In various embodiments, controller 1620 is configured to control the operation of the heaters independently and/or in groups.

In the foregoing specification, embodiments have been described with reference to specific implementations. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the disclosure.

What is claimed is:

1. A system comprising:
- a heater having a first heating element and a second heating element, the first heating element configured to generate heat using a first current and the second heating element configured to generate heat using a second current; and
- an electromagnetic (EM) radiation reducing device configured to reduce electromagnetic emissions from the first heating element and the second heating element, the EM radiation reducing device having a first electromagnetic (EM) radiation reduction element positioned adjacent to a first side of the heater and a second EM radiation reduction element positioned adjacent to a second side of the heater, wherein the first EM radiation reduction element has an elliptical curvature and geometry based at least in part on the heater.

2. The system of claim 1, wherein the second EM radiation reduction element has an elliptical curvature and geometry based at least in part on the heater.

3. The system of claim 2, wherein the first and second EM radiation reduction elements have elliptical curvatures configured to surround, at least in part, the first heating element and the second heating element.

4. The system of claim 3, wherein the heater is a planar heater, and wherein the first heating element and the second heating element are planar heating elements.

5. The system of claim 4, wherein the first planar heating element and the second planar heating element are arranged such that their poles are opposite to each other.

6. The system of claim 5, wherein the first and second currents are alternating currents.

7. The system of claim 1, wherein the EM radiation reducing device further comprises:
- a first frame coupled to the first EM radiation reduction element;
- a second frame coupled to the second EM radiation reduction element; and
- a plurality of couplers configured to couple the first frame to the second frame, and further configured to hold the heater in place.

8. The system of claim 1, wherein the EM radiation reducing device is coupled to a circuit ground.

9. The system of claim 1, wherein the EM radiation is extremely low frequency (ELF) EM radiation.

10. The system of claim 1, wherein the heater is included in a plurality of heaters, wherein the EM radiation reducing device is included in a plurality of EM radiation reducing devices, and wherein the plurality of heaters and the plurality of EM radiation reducing devices are included in a sauna.

11. The system of claim 1, wherein the heater is removably coupled to the EM radiation reducing device.

12. A sauna comprising:
- a heater having a first heating element and a second heating element, the first heating element configured to generate heat using a first current and the second heating element configured to generate heat using a second current;
- an electromagnetic (EM) radiation reducing device configured to reduce electromagnetic emissions from the first heating element and the second heating element, the EM radiation reducing device having a first electromagnetic (EM) radiation reduction element positioned adjacent to a first side of the heater and a second EM radiation reduction element positioned adjacent to a second side of the heater, wherein the first EM radiation reduction element has an elliptical curvature and geometry based at least in part on the heater; and
- a sitting area positioned near the first side of the heater.

13. The sauna of claim 12, wherein the second EM radiation reduction element has an elliptical curvature and geometry based at least in part on the heater.

14. The sauna of claim 13, wherein the first and second EM radiation reduction elements have elliptical curvatures configured to surround, at least in part, the first heating element and the second heating element.

15. The sauna of claim 14, wherein the heater is a planar heater, and wherein the first heating element and the second heating element are planar heating elements.

16. The sauna of claim 15, wherein the first planar heating element and the second planar heating element are arranged such that their poles are opposite to each other.

17. The sauna of claim 16, wherein the first and second currents are alternating currents.

18. The sauna of claim 12, wherein the EM radiation reducing device further comprises:
- a first frame coupled to the first EM radiation reduction element;
- a second frame coupled to the second EM radiation reduction element; and
- a plurality of couplers configured to couple the first frame to the second frame, and further configured to hold the heater in place.

19. The sauna of claim 12, wherein the EM radiation reducing device is coupled to a circuit ground.

20. The sauna of claim 12, wherein the EM radiation is extremely low frequency (ELF) EM radiation.

* * * * *